(12) United States Patent
Igarashi et al.

(10) Patent No.: US 6,706,799 B2
(45) Date of Patent: Mar. 16, 2004

(54) CONDUCTIVE SILICONE RUBBER COMPOSITION

(75) Inventors: Minoru Igarashi, Annaka (JP); Yoshiaki Koike, Takasaki (JP); Atsushi Yaginuma, Gunma-gun (JP); Tsutomu Nakamura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/214,555

(22) Filed: Aug. 9, 2002

(65) Prior Publication Data

US 2003/0047721 A1 Mar. 13, 2003

(30) Foreign Application Priority Data

Aug. 10, 2001 (JP) .................................... 2001-244799

(51) Int. Cl.$^7$ ................................. C08K 3/04
(52) U.S. Cl. ............... 524/495; 524/424; 524/435; 524/496; 524/588; 428/402; 428/403; 528/24
(58) Field of Search ................. 428/402, 403; 524/424, 495, 496, 435, 588; 528/24

(56) References Cited

U.S. PATENT DOCUMENTS 5,910,524 A * 6/1999 Kalinoski .................... 523/215
6,414,078 B1 * 7/2002 Fukushima et al. ......... 524/588

* cited by examiner

*Primary Examiner*—Robert Dawson
*Assistant Examiner*—Marc S Zimmer
(74) *Attorney, Agent, or Firm*—Oblon, Spivak, McClelland, Maier & Neustadt, P.C.

(57) ABSTRACT

A conductive silicone rubber composition is provided, which includes (a) 100 parts by weight of an organopolysiloxane represented by an average composition formula of $R_a SiO_{(4-a)/2}$ wherein R is an unsubstituted or substituted monovalent hydrocarbon group which may be the same or different, and a is a positive number of 1.90 to 2.05, (b) 50 to 500 parts by weight of conductive particles comprising carbon coated with Ni, and (c) 0.1 to 10 parts by weight of an organic peroxide. This composition has an adequate pot life, is unlikely to be affected by catalyst poisoning, and is suitable for normal pressure hot air vulcanization. Cured products produced from the composition has a low volume resistivity and excellent electromagnetic interference sealing properties.

12 Claims, No Drawings

CONDUCTIVE SILICONE RUBBER COMPOSITION

FIELD OF THE INVENTION

The present invention relates to an organic peroxide vulcanization type conductive silicone rubber composition, and in particular to a conductive silicone rubber composition suitable for use in electromagnetic interference sealed gasket materials, conductive contact members, connectors, and roller members in office equipment and the like.

DESCRIPTION OF THE PRIOR ART

Conventionally, methods for producing silicone rubber with a low electrical resistance have involved the addition of a metallic powder with a high electrical conductivity to known silicone rubber compositions such as addition reaction curing type silicone rubber compositions, condensation reaction curing type silicone rubber compositions and peroxide vulcanization type silicone rubber compositions. However, in cases in which a metal such as silver powder or nickel powder or the like is used as the conductive powder, problems arise in that the degree of agglomeration of the metallic powder is high, meaning the powder is not uniformly dispersed within the silicone rubber, and the environmental stability is poor, meaning the metal surface oxidizes and deteriorates, particularly under conditions of high temperature and high humidity.

Furthermore, although conductive silicone rubbers in which carbon such as conductive carbon black or graphite has been dispersed display comparatively good heat resistance, producing a material of superior conductivity with a volume resistivity of no more than $1 \times 10^{-3}$ $\Omega \cdot m$ has been difficult.

An example of the conventional technology is an addition reaction curing type conductive silicone resin composition containing nickel coated carbon, disclosed in Japanese Laid-open publication (kokai) No. 59-199756 (JP59-199756A). However, addition reaction curing type compositions typically use platinum based catalysts, and suffer from problems including susceptibility to catalyst poisoning and a short pot life.

As a result of intensive research aimed at resolving the problems described above, the inventors of the present invention discovered that a silicone rubber composition using a radical generating organic peroxide compound enabled the production of a conductive silicone rubber composition which was in no way inferior, and were hence able to complete the present invention.

SUMMARY OF THE INVENTION

In other words, an object of the present invention is to provide an organic peroxide vulcanization type conductive silicone rubber composition which has an adequate pot life, is unlikely to be affected by catalyst poisoning, displays excellent dispersibility, is suitable for normal pressure hot air vulcanization (HAV), and displays superior mechanical properties such as tensile strength and elongation, a low volume resistivity, and excellent electromagnetic interference sealing, as well as providing an electromagnetic interference sealed material comprising a conductive silicone rubber produced from such a composition.

As a result of intensive investigations aimed at achieving the aforementioned object, the inventors of the present invention discovered that by combining nickel coated carbon with an organopolysiloxane, and vulcanizing the mixture using an organic peroxide, a superior conductive silicone rubber could be obtained.

In other words, the present invention provides a conductive silicone rubber composition comprising:
(a) 100 parts by weight of an organopolysiloxane represented by an average composition formula of $R_aSiO_{(4-a)/2}$ wherein, R is an unsubstituted or substituted monovalent hydrocarbon group which may be the same or different, and a is a positive number of 1.90 to 2.05,
(b) 50 to 500 parts by weight of conductive particles of carbon coated with Ni, and
(c) 0.1 to 10 parts by weight of an organic peroxide, and also provides an electromagnetic interference sealed material produced from the composition.

DETAILED DESCRIPTION OF THE PREFERRED EMBODIMENTS

As follows is a detailed description of each of the constituents of a silicone rubber composition according to the present invention.
(a) Organopolysiloxane In the present invention, an organopolysiloxane used as the base constituent is represented by an average composition formula (I) shown below.

$$R_aSiO_{(4-a)/2} \qquad (1)$$

In this formula, R represents an unsubstituted or substituted monovalent hydrocarbon group of preferably 1 to 10 carbon atoms, and even more preferably 1 to 8 carbon atoms, which may be the same or different, selected alkyl groups such as methyl groups, ethyl groups, propyl groups and butyl groups, cycloalkyl groups such as cyclohexyl groups, alkenyl groups such as vinyl groups, allyl groups, butenyl groups and hexenyl groups, aryl groups such as phenyl groups and tolyl groups, as well as groups in which a portion of, or all of, the hydrogen atoms bonded to carbon atoms within the above groups are substituted with halogen atoms or cyano groups or the like, such as chloromethyl groups, trifluoropropyl groups and cyanoethyl groups. Methyl groups, phenyl groups, vinyl groups and trifluoropropyl groups are particularly preferred, and at least 80 mol %, and preferably at least 95 mol %, of the R groups should preferably be methyl groups.

Furthermore, the rate of incorporation of alkenyl groups within the total amount of R groups should preferably be 0.001 to 20 mol %, and even more preferably from 0.025 to 5 mol %. At values less than 0.001 mol %, the vulcanization may be unsatisfactory, whereas at values exceeding 20 mol %, the workability and mechanical characteristics of the rubber may deteriorate.

Furthermore, a is a positive number from 1.90 to 2.05.

The organopolysiloxane of the formula (1) should preferably be basically a straight chain structure, although may also be a mixture of two or more compounds with different molecular structures. The molecular chain terminals should preferably be blocked with vinyl group-containing silyl groups such as dimethylvinylsilyl groups, methyldivinylsilyl groups or trivinylsilyl groups. In addition, the average degree of polymerization of the above organopolysiloxane should be from 100 to 20,000, and preferably from 3,000 to 10,000. At values less than 100, good mechanical characteristics may be unachievable, whereas at values exceeding 20,000, the addition and mixing of conductive particles may become difficult.

The conductive particles of Ni coated carbon of the constituent (b) are a particularly important constituent in imparting good conductivity and electromagnetic interference sealing to the silicone rubber. Suitable examples of the carbon material for coating with Ni include normal carbon black, artificial graphite, natural graphite or granulated carbon, although artificial graphite is particularly preferred.

The average particle diameter of the carbon should preferably be from 10 to 300 µm, with particles of 20 to 150 µm being particularly preferred. If the average particle diameter is less than 10 µm, then the Ni coating process may become difficult, whereas if the average particle diameter exceeds 300 µm, then the mechanical strength of the conductive silicone rubber may deteriorate. Furthermore, the amount of Ni used in the coating is from 20 to 90% by weight, and preferably from 50 to 80% by weight, relative to the weight of carbon. At values less than 20% by weight, the initial conductivity may be unsatisfactory, whereas at values exceeding 90% by weight, the variation in the conductivity over time at high temperature may increase.

Examples of suitable Ni coating methods include normal chemical plating methods, electrolytic methods and carbonyl methods, although carbonyl methods are particularly preferred from the viewpoint of preventing the introduction of impurities.

The amount of the constituent (b) added is from 50 to 500 parts by weight, and preferably from 150 to 300 parts by weight, per 100 parts by weight of the organopolysiloxane of the constituent (a). At amounts less than 50 parts by weight, the conductivity and electromagnetic interference sealing achieved is unsatisfactory, whereas at amounts exceeding 500 parts by weight, the workability associated with the addition of the conductive particles becomes markedly more difficult.

Examples of the organic peroxide of the constituent (c) include low temperature decomposition organic peroxides such as benzoyl peroxide, di-(2,4-dichlorobenzoyl)peroxide, di-(4-methylbenzoyl)peroxide and di-(2-methylbenzoyl) peroxide, and high temperature decomposition organic peroxides such as dicumyl peroxide, 2,5-dimethyl-bis-(2,5-t-butylperoxy)hexane, di-t-butyl peroxide and t-butylperbenzoate, and combinations of two or more different peroxides may also be used.

The amount of the organic peroxide added is from 0.1 to 10 parts by weight, and preferably from 0.2 to 5 parts by weight, per 100 parts by weight of the organopolysiloxane of the constituent (a).

Particularly by using low temperature decomposition organic peroxides such as di-(2,4-dichlorobenzoyl)peroxide, di-(4-methylbenzoyl)peroxide and di-(2-methylbenzoyl) peroxide, normal pressure hot air vulcanization (HAV) also becomes feasible. These low temperature decomposition peroxides can also be used in combination with a high temperature decomposition organic peroxide.

Furthermore, in order to improve workability, it is preferable that from 0.1 to 20 parts by weight, and preferably from 0.2 to 10 parts by weight, of a hydroxyl group-containing organosilicon compound with a degree of polymerization of no more than 100, and preferably no more than 20, is also added to a composition of the present invention.

Specifically, hydroxyl group-containing organosilicon compounds represented by the formula shown below can be used.

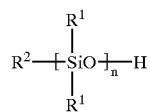

(wherein, n is an integer from 1 to 100, and $R^1$ represents a group which is the same as defined for R described above, and preferably a methyl group, vinyl group, phenyl group or trifluoropropyl group, and even more preferably a methyl group or a vinyl group. $R^2$ represents a hydroxyl group or a group which is the same as defined for R described above, although a hydroxyl group is preferred.)

In addition to the essential constituents described above, where necessary reinforcing silica powder may also be added to a conductive silicone rubber composition according to the present invention, provided such addition does not impair the effects of the present invention. Reinforcing silica powder is added to obtain a silicone rubber composition with superior mechanical strength, and in order to achieve this effect the specific surface area of the silica powder should be at least 50 $m^2/g$, and preferably from 100 to 400 $m^2/g$. If the specific surface area is less than 50 $m^2/g$, then the reinforcing effect on the cured product may be insufficient. Examples of this type of reinforcing silica include fumed silica and precipitated silica, and silica powders of this type in which the surface has undergone hydrophobic treatment with a reactive organosilicon compound such as chlorosilane or hexamethyldisilazane can also be used effectively.

The amount of the reinforcing silica powder added should be from 3 to 70 parts by weight, and preferably from 10 to 50 parts by weight, per 100 parts by weight of the organopolysiloxane of the constituent (a). At amounts less than 3 parts by weight, the addition amount is too small and a reinforcement effect may not be obtained, whereas at amounts exceeding 70 parts by weight, the workability deteriorates and the mechanical strength may also deteriorate.

Furthermore, other conventionally known conductive materials including conductive carbon black and other conductive inorganic oxides such as conductive ZnO or conductive $TiO_2$, or other fillers including extenders such as silicone rubber powder, red iron oxide, crushed quartz powder or calcium carbonate may also be added in combination with the Ni coated carbon particles.

In addition, an inorganic or organic foaming agent may also be added in order to form foam based or porous structures. Suitable examples of this foaming agent include azobisisobutyronitrile, dinitropentamethylenetetramine, benzenesulfonehydrazide and azodicarbonamide, and the amount of this foaming agent added should be within a range from 0.5 to 20 parts by weight, and preferably from 1 to 10 parts by weight, per 100 parts by weight of the composition of the present invention. In this manner, by adding a foaming agent to a composition of the present invention, a foam type or porous structure silicone rubber can be produced.

Furthermore where required, various additives such as coloring agents or heat resistance enhancing agents, and reaction inhibitors or mold releasing agents may also be added to a conductive silicone rubber composition according to the present invention. Diphenylsilane, the various alkoxysilanes and carbon functional silane and the like may also be added.

In addition, in order to produce a flame retardant or fire resistant silicone rubber composition, any of the known additives such as platinum containing materials, mixtures of platinum compounds and titanium dioxide, mixtures of platinum and manganese carbonate, mixtures of platinum and γ-$Fe_2O_3$, ferrite, mica, glass fiber or glass flakes may be added to a conductive silicone rubber composition according to the present invention.

A conductive silicone rubber composition according to the present invention can be prepared by mixing the above constituents uniformly with a rubber kneading device such as a twin-roll mill, a Banbury mixer or a dough mixer (kneader), and then carrying out subsequent heat treatment where required. A silicone rubber material produced in this manner can then be formed into the shape required using any of various molding methods including die pressure molding, extrusion molding or calender molding.

Moreover, the conditions for the vulcanization and curing can be selected appropriately in accordance with the vulcanization method used and the thickness of the molded product, although typically the vulcanization and curing is conducted under heat, at a temperature of 80 to 400° C. for a period from 10 seconds to 30 days. Particularly in the case of normal pressure hot air vulcanization, the vulcanization should preferably be conducted at a temperature of 200 to 400° C.

Furthermore where necessary, a secondary heated vulcanization and curing (post curing) process may also be performed at a temperature of 150 to 250° C. for a period of 1 to 10 hours.

Because the volume resistivity of a cured product of a silicone rubber composition of the present invention is no more than $1 \times 10^{-1}$ Ω·m, and preferably no more than $1 \times 10^{-3}$ Ω·m, the cured product can be ideally used for connectors and electromagnetic interference sealed materials and the like.

EXAMPLES

As follows is a series of examples, although the present invention is in no way limited to the examples presented.

Example 1

(1) 100 parts by weight of an organopolysiloxane containing 99.825 mol % of dimethylsiloxane units, 0.15 mol % of methylvinylsiloxane units and 0.025 mol % of dimethylvinylsiloxane units, with an average degree of polymerization of 8,000

(2) 25 parts by weight of fumed silica with a specific surface area of 200 $m^2$/g (manufactured by Nippon Aerosil (Ltd.))

(3) 3 parts by weight of a dimethylpolysiloxane with silanol groups at both terminals and with an average degree of polymerization of 15

(4) 200 parts by weight of Ni coated artificial graphite (Nickel Clad Graphite 75Ni/C25 manufactured by Westaim Co. Ltd.) (average particle diameter: 50 μm, amount of Ni coating: 75% by weight)

The constituents (1) to (4) above were mixed together in a kneader to produce a base compound.

To this base compound was added 0.5 parts by weight of 2,5-dimethyl-2,5-di-(tertiary-butylperoxy)hexane using a twin-roll mill, and the mixture was then heated at 170° C. for 10 minutes and pressure molded to yield a 1 mm sheet. Following subsequent post curing for 1 hour at 150° C., the mechanical strength and conductivity and the like of the rubber sheet were measured in accordance with JIS SRIS-2301. The results are shown in Table 1. The above measurement methods were also used for the other examples and comparative examples described below.

Example 2

With the exception of using 0.7 parts by weight of di-(4-methylbenzoyl)peroxide as the peroxide, a rubber sheet was prepared in the same manner as the example 1.

Example 3

With the exception of using di-(2,4-dichlorobenzoyl) peroxide as the peroxide, a rubber sheet was prepared in the same manner as the example 2.

Example 4

Following conversion of the base compound obtained in the example 2 into a sheet of thickness 1 mm using a twin-roll mill, the sheet was heated for 10 minutes at 200° C. The sheet was then post cured for 1 hour at 150° C. to yield a rubber sheet.

The rubber sheets of the examples 1 to 4 were measured for mechanical strength and conductivity.

Comparative Example 1

With the exception of reducing the amount of Ni coated graphite added to 30 parts by weight, a rubber sheet was produced in the same manner as the example 1. The mechanical strength and conductivity of the rubber sheet were then measured.

TABLE 1

|  | Example 1 | Example 2 | Example 3 | Example 4 | Comparative Example 1 |
| --- | --- | --- | --- | --- | --- |
| Specific gravity (23° C.) | 2.2 | 2.2 | 2.2 | 2.2 | 1.2 |
| Hardness (JISA) | 71 | 61 | 63 | 62 | 55 |
| Tensile strength (M · Pa) | 2.0 | 2.1 | 2.5 | 2.6 | 5.8 |
| Elongation (%) | 260 | 480 | 450 | 470 | 450 |
| Volume resistivity (Ω · m) | $6.4 \times 10^{-4}$ | $8.5 \times 10^{-4}$ | $7.2 \times 10^{-4}$ | $1.5 \times 10^{-3}$ | insulating (measurement impossible) |

A conductive silicone rubber composition according to the present invention has an adequate pot life, is unlikely to be affected by catalyst poisoning, and is suitable for normal pressure hot air vulcanization, and a cured product produced from such a composition has a low volume resistivity and excellent electromagnetic interference sealing properties, and consequently a conductive silicone rubber can be produced which is ideally suited for use in electromagnetic interference sealed gasket materials, conductive contact members, connectors, and roller members in office equipment and the like.

What is claimed is:

1. A conductive silicone rubber composition, comprising:
   (a) 100 parts by weight of an organopolysiloxane represented by an average composition formula of $R_aSiO_{(4-a)/2}$ wherein R is an unsubstituted or substituted monovalent hydrocarbon group which is the same or different, and a is a positive number of 1.90 to 2.05;
   (b) 50 to 500 parts by weight of conductive particles of graphite coated with Ni; and
   (c) 0.1 to 10 parts by weight of an organic peroxide.

2. The composition according to claim 1, wherein the R group each have 1 to 10 carbon atoms, and are indepently an alkyl group, a cycloalkl group, an alkenyl, an aryl group, or a corresponding subituted group in which a portion of or all of the hydrogen atoms bonded to carbon atoms within the above groups are substituted with a halogen atom or a cyano group.

3. The composition according to claim 1, wherein the rate of incorporation of alkenyl groups within the total amount of R groups is in the range of 0.001 to 20 mol %.

4. The composition according to claim 1, wherein the organopolysiloxane of the constituent (a) basically has a straight chain structure, and its molecular chain terminals are blocked with vinyl group-containing silyl groups.

5. The composition according to claim 1, wherein the organopolysiloxane of the constituent (a) has an average degree of polymerization of 100 to 20,000.

6. The composition according to claim 1, wherein said conductive particles of constituent (b) have an average particle diameter of 10 to 300 μm.

7. The composition according to claim 1, wherein the amount of Ni present in the conductive particles is from 20 to 90% by weight.

8. The composition according to claim 1 further comprising 0.1 to 20 parts by weight of (d) a hydroxyl group-containing organosilicon compound with a degree of polymerization of no more than 100, in addition to said constituents (a), (b) and (c).

9. The composition according to claim 8, wherein said hydroxyl group-containing organosilicon compound of constituent (d) is represented by the formula:

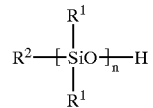

wherein, n is an integer from 1 to 100, $R^1$ represents a group which is the same as defined for R described above, and $R^2$ represents a hydroxyl group or a group which is the same as defined for R described above.

10. The composition according to claim 1, which further comprises a reinforcing silica powder.

11. The composition according to claim 1 which is normal pressure hot air vulcanizable (HAV), wherein said organic peroxide compound of constituent (c) is at least one compound selected from the group consisting of di-(2,4-dichlorobenzoyl)peroxide, di-(4-methylbenzoyl)peroxide and di-(2-methylbenzoyl)peroxide.

12. An electromagnetic interference sealed material formed from a conductive silicone rubber obtained from a composition according to claim 1.

* * * * *